US012495727B2

(12) United States Patent
Schroeder

(10) Patent No.: US 12,495,727 B2
(45) Date of Patent: *Dec. 16, 2025

(54) SYSTEM AND METHOD FOR CONTROLLING THE OPERATION OF AN AGRICULTURAL IMPLEMENT

(71) Applicant: CNH Industrial America LLC, New Holland, PA (US)

(72) Inventor: Brittany Schroeder, Bunker Hill, IN (US)

(73) Assignee: CNH Industrial America LLC, New Holland, PA (US)

( * ) Notice: Subject to any disclaimer, the term of this patent is extended or adjusted under 35 U.S.C. 154(b) by 386 days.

This patent is subject to a terminal disclaimer.

(21) Appl. No.: 17/939,451

(22) Filed: Sep. 7, 2022

(65) Prior Publication Data

US 2024/0074342 A1 Mar. 7, 2024

(51) Int. Cl.
*A01B 79/00* (2006.01)
*A01B 35/16* (2006.01)
(Continued)

(52) U.S. Cl.
CPC .......... *A01B 79/005* (2013.01); *A01B 63/004* (2013.01); *G05D 1/0214* (2013.01);
(Continued)

(58) Field of Classification Search
CPC ..... A01B 79/005; A01B 63/004; A01B 35/16; G05D 1/0214; G05D 1/0231; G06V 10/761; G06V 20/188
(Continued)

(56) References Cited

U.S. PATENT DOCUMENTS 6,253,136 B1 * 6/2001 Stratton .................... E02F 9/22
172/3
8,576,056 B2 11/2013 Clair et al.
(Continued)

FOREIGN PATENT DOCUMENTS

CN 109937685 A 6/2019
CN 112237087 A 1/2021
(Continued)

OTHER PUBLICATIONS

Walker, Jeffrey, "Statistics in Criminal Justice: Analysis and Interpretation", 1999, Aspen Publishing, 1st Edition, pp. 74-75. (Year : 1999).*

(Continued)

*Primary Examiner* — Krishnan Ramesh
(74) *Attorney, Agent, or Firm* — Dority & Manning, P.A.

(57) ABSTRACT

An agricultural implement includes a computing system is configured to identify a plurality of residue pieces present within the portion of the field based on the image data generated by the imaging device. Furthermore, the computing system is configured to determine a number of residue pieces having a length within a first length range and a number of residue pieces of the identified plurality of residue pieces having a length within a second length range. Additionally, the computing system is configured to determine a characteristic length range for the portion of the field, with the characteristic length range corresponding to one of the first length range or the second length range having the greatest number of residue pieces associated therewith. Moreover, the computing system is configured to provide a notification associated with the determined characteristic length range to an operator of the agricultural implement.

12 Claims, 6 Drawing Sheets

(51) Int. Cl.
*A01B 63/00* (2006.01)
*G05D 1/00* (2024.01)
*G06V 10/74* (2022.01)
*G06V 20/10* (2022.01)

(52) U.S. Cl.
CPC ......... *G05D 1/0231* (2013.01); *G06V 10/761* (2022.01); *G06V 20/188* (2022.01); *A01B 35/16* (2013.01)

(58) Field of Classification Search
USPC .......................................................... 701/50
See application file for complete search history.

(56) References Cited

U.S. PATENT DOCUMENTS

| | | | |
|---|---|---|---|
| 9,554,098 B2 | 1/2017 | Casper et al. | |
| 9,600,872 B2 | 3/2017 | Dima | |
| 10,524,409 B2 | 1/2020 | Posselius et al. | |
| 10,687,476 B2 | 6/2020 | Gowa | |
| 10,721,859 B2 | 7/2020 | Wu et al. | |
| 10,813,265 B2 | 10/2020 | Stanhope | |
| 10,820,472 B2 | 11/2020 | Stahope et al. | |
| 10,820,476 B2 | 11/2020 | Stoller et al. | |
| 11,058,045 B2 | 7/2021 | Harmon | |
| 11,259,455 B2 | 3/2022 | Johnson et al. | |
| 11,266,056 B2 | 3/2022 | Nair et al. | |
| 11,277,956 B2 | 3/2022 | Bertucci et al. | |
| 11,360,984 B1* | 6/2022 | Zicari | G06F 16/2465 |
| 2019/0090432 A1* | 3/2019 | Duquette | G06Q 10/06 |
| 2019/0104947 A1* | 4/2019 | Shigemori | A61B 5/352 |
| 2019/0124819 A1 | 5/2019 | Madsen et al. | |
| 2020/0344939 A1* | 11/2020 | Sporrer | H04N 23/54 |
| 2020/0352081 A1 | 11/2020 | Arnett et al. | |
| 2020/0352088 A1* | 11/2020 | Arnett | A01B 63/1112 |
| 2021/0007266 A1 | 1/2021 | Stoller et al. | |
| 2021/0080586 A1 | 3/2021 | Dasika et al. | |
| 2021/0084803 A1 | 3/2021 | Harmon et al. | |
| 2021/0084820 A1 | 3/2021 | Vandike et al. | |
| 2021/0153420 A1 | 5/2021 | Smith | |
| 2021/0176912 A1 | 6/2021 | Harmon | |
| 2021/0212249 A1 | 7/2021 | Disberger et al. | |
| 2021/0259148 A1 | 8/2021 | Schmidt | |
| 2021/0267115 A1 | 9/2021 | Fjelstad et al. | |
| 2022/0101554 A1* | 3/2022 | Fu | G06V 10/82 |
| 2022/0117153 A1 | 4/2022 | Nielsen | |
| 2022/0117215 A1* | 4/2022 | Sibley | A01M 21/00 |
| 2022/0262027 A1* | 8/2022 | Henry | G06V 20/56 |
| 2022/0264783 A1* | 8/2022 | Johnson | A01B 71/08 |
| 2023/0050483 A1* | 2/2023 | Bout | B60C 23/0479 |

FOREIGN PATENT DOCUMENTS

| | | | |
|---|---|---|---|
| DE | 10351861 A1 | 6/2005 | |
| DE | 102017130694 A1 | 6/2019 | |
| DE | 102018200411 A1 | 7/2019 | |
| DE | 102018213212 A1 | 2/2020 | |
| EP | 2936957 A1 | 10/2015 | |
| EP | 2545761 B1 | 12/2016 | |
| EP | 3189719 A1 | 7/2017 | |
| EP | 3167698 B1 | 4/2020 | |
| EP | 3732941 A1 | 11/2020 | |
| EP | 3981232 | 4/2022 | |
| WO | WO 2020/217106 A1 | 10/2020 | |
| WO | WO 2020/231934 | 11/2020 | |

OTHER PUBLICATIONS

Modal Class Interval—Corbettmaths—https://www.youtube.com/watch?v=Cwk6_6RpJ3o (corbettmaths) (2:45-4:52) (Year: 2021).*
The modal and median class from grouped data—https://www.youtube.com/watch?v=UzSdTd4eTll (Mark Willis) (0:00-0:30) (Year : 2015).*
Screen Captures from YouTube Video Clip "Lavori conto terzi vigna in Sardegna. Impresa Agricola Piga Franco Villaputzu" Uploaded on Mar. 10, 2014, by user "Cavalliecavalli macchine agricole in Sardegna" (7 pages). Retrieved from Internet: https://www.youtube.com/watch?v=Bliki_rD534&t=0s.
Screen Captures from YouTube Video Clip "3D sensor on a tractor—on the way to agriculture 4.0" Uploaded on Oct. 27, 2015, by user "ifm group of companies" (6 pages) Retrieved from Internet: https://www.youtube.com/watch?v=9Jlr_7H5pvQ.
Screen Captures from YouTube Video Clip "Vertical Tillage—Viking" Uploaded on Aug. 9, 2016, by user "Versatile" (6 pages) Retrieved from Internet: https://www.youtube.com/watch?v=hSyQEdvzwtU.
"Grain Harvesting" Combines and Front End Equipment John Deere (44 pages) https://www.deere.com/assets/pdfs/region-1/products/combines/2018 S700-Series Combine.pdf.
Dan Crummett "Variable Intensity Tillage Offers Solutions for Varying Soil Conditions" Niche Equipment Markets Manufacturer News Mar. 18, 2019 (11 pages) https://www.farm-equipment.com/articles/16770-variable-intensity-tillage-offers-solutions-for-varying-soil-conditions.
Jessie Scott "Dynamically Adjustable Tillage System From Gates Manufacturing" Jun. 16. 2015 (3 pages) https://www.agriculture.com/machinery/precision-agriculture/dynamically-adjustable-tillage-system_234-ar49223.
"VT Flex™ 435 Vertical Tillage Tool" Specifications Case IH (4 pages) https://assets.cnhindustrial.com/caseih/NAFTA/NAFTAASSETS/Products/Tillage/Vertical-Tillage/Brochures/VT-FLEX_435_Spec_Sheet_10-21_CIH21100801_pages.pdf.
J.M. Guerrero, et al. "Automatic expert system based on images for accuracy crop row detection in maize fields" Expert Systems with Applications 40 (2013) 656-665 Elsevier Ltd. (9 pages) https://oa.upm.es/32345/1/INVE_MEM_2013_177714.pdf.
Björn Åstrand, et al. "An Agricultural Mobile Robot with Vision-Based Perception for Mechanical Weed Control" Autonomous Robots 13, 21-35, 2002 2002 Kluwer Academic Publishers (15 pages) https://sci-hub.hkvisa.net/10.1023/a.1015674004201.

* cited by examiner

SYSTEM AND METHOD FOR CONTROLLING THE OPERATION OF AN AGRICULTURAL IMPLEMENT

FIELD OF THE INVENTION

The present disclosure generally relates to agricultural implements and, more particularly, to systems and methods for controlling the operation of an agricultural implement.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. In general, tillage implements include ground-engaging tools, such as shanks, disks, and/or the like, supported on its frame. Each ground-engaging tool, in turn, is configured to be moved relative to the soil within the field as the tillage implement travels across the field. Such movement of the ground-engaging tools loosens and/or otherwise agitates the soil to prepare the field for subsequent planting operations.

Upon completion of the tillage operation, it is generally desirable that the residue pieces remaining on the field surface be of a given length to maintain the productivity potential of the soil. In this respect, systems for controlling the operation of an agricultural implement such that the residue pieces remaining on the field surface are of the given length have been developed. While such systems work well, further improvements are needed.

Accordingly, an improved system and method for controlling the operation of an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an agricultural implement including a frame and a ground-engaging tool supported on the frame, with the ground-engaging tool configured to perform an operation on a field as the agricultural implement travels across the field. Furthermore, the agricultural implement includes an imaging device configured to generate image data depicting a portion of the field and a computing system communicatively coupled to the imaging device. In this respect, the computing system is configured to identify a plurality of residue pieces present within the portion of the field based on the image data generated by the imaging device. Additionally, the computing system is configured to determine a number of residue pieces of the identified plurality of residue pieces having a length within a first length range. Moreover, the computing system is configured to determine a number of residue pieces of the identified plurality of residue pieces having a length within a second length range, with the second length range being different from the first length range. In addition, the computing system is configured to determine a characteristic length range for the portion of the field, with the characteristic length range corresponding to one of the first length range or the second length range having the greatest number of residue pieces associated therewith. Furthermore, the computing system is configured to provide a notification associated with the determined characteristic length range to an operator of the agricultural implement.

In another aspect, the present subject matter is directed to a system for controlling the operation of an agricultural implement. The system includes an imaging device configured to generate image data depicting a portion of a field across which the agricultural implement is traveling and a computing system communicatively coupled to the imaging device. In this respect, the computing system is configured to identify a plurality of residue pieces present within the portion of the field based on the image data generated by the imaging device. Additionally, the computing system is configured to determine a number of residue pieces of the identified plurality of residue pieces having a length within a first length range. Moreover, the computing system is configured to determine a number of residue pieces of the identified plurality of residue pieces having a length within a second length range, with the second length range being different from the first length range. In addition, the computing system is configured to determine a characteristic length range for the portion of the field, with the characteristic length range corresponding to one of the first length range or the second length range having the greatest number of residue pieces associated therewith. Furthermore, the computing system is configured to provide a notification associated with the determined characteristic length range to an operator of the agricultural implement.

In a further aspect, the present subject matter is directed to a method for controlling the operation of an agricultural implement. The method includes receiving, with a computing system, image data depicting a portion of a field across which an agricultural implement is traveling. Additionally, the method includes identifying, with the computing system, a plurality of residue pieces present within the portion of the field based on the received image data. Moreover, the method includes determining, with the computing system, a number of residue pieces of the identified plurality of residue pieces having a length within a first length range. In addition, the method includes determining, with the computing system, a number of residue pieces of the identified plurality of residue pieces having a length within a second length range, with the second length range being different from the first length range. Furthermore, the method includes determining, with the computing system, a characteristic length range for the portion of the field, with the characteristic length range corresponding to one of the first length range or the second length range having the greatest number of residue pieces associated therewith. Additionally, the method includes providing, with the computing system, a notification associated with the determined characteristic length range to an operator of the agricultural implement.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
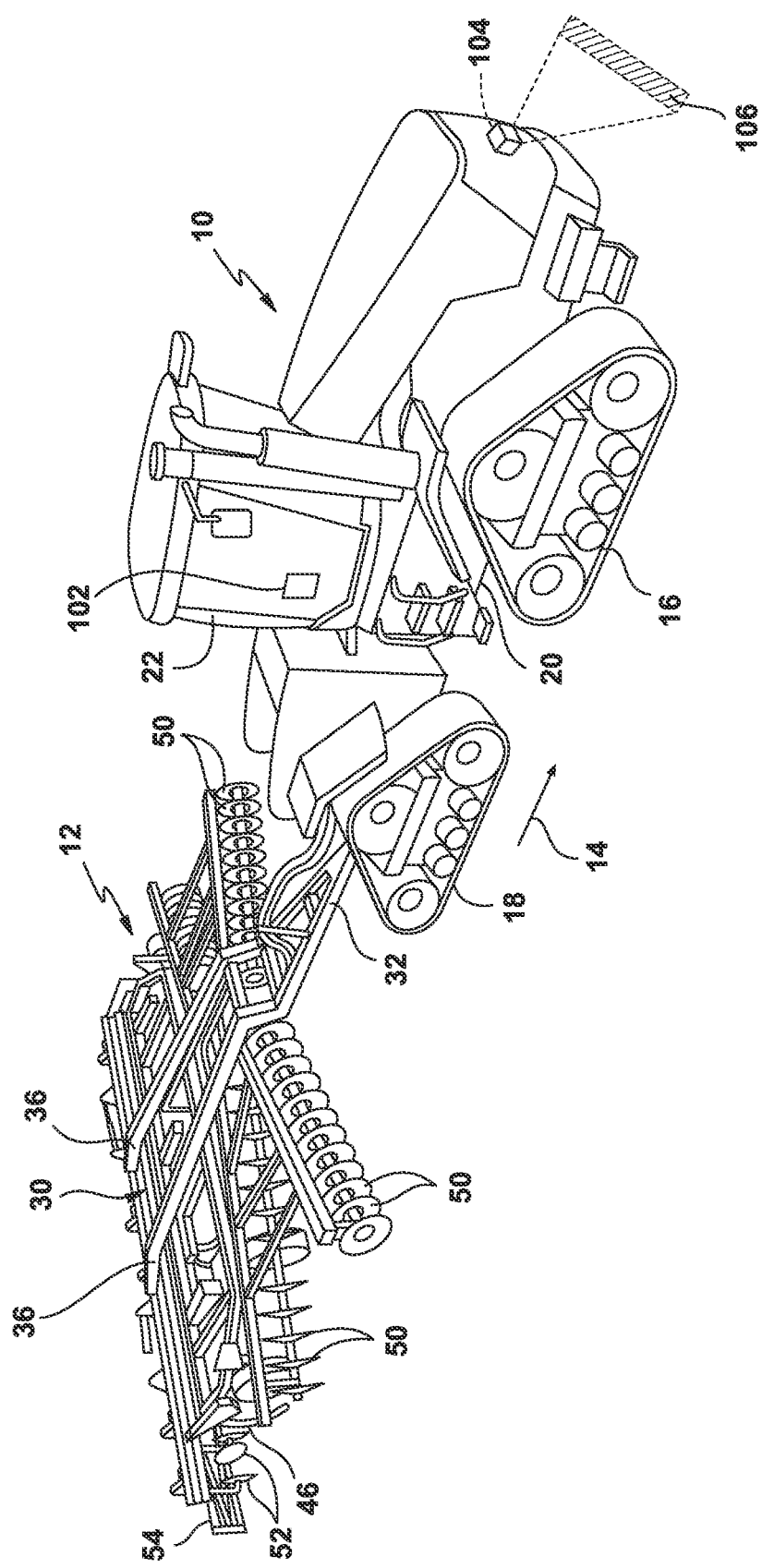
FIG. 1 illustrates a perspective view of one embodiment of a work vehicle towing an agricultural implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to a system and a method for controlling the operation of an agricultural implement. Specifically, in several embodiments, a computing system of the disclosed system is configured to receive image data depicting a portion of the field across which the agricultural implement is traveling (e.g., to perform an agricultural operation thereon). Furthermore, the computing system is configured to identify a plurality of residue pieces present within the portion of the field based on the received image data. In addition, the computing system is configured to determine the number of identified residue pieces having a length within a first length range and the number of identified residue pieces having a length within a different, second length range. Moreover, the computing system is configured to determine a characteristic length range for the imaged portion of the field. The characteristic length range, in turn, corresponds to the first length range or the second length range having the greatest number of residue pieces associated therewith.

Additionally, in several embodiments, the computing system is configured to provide a notification associated with the determined characteristic length range to the operator of the agricultural implement. For example, in one embodiment, the notification may be a visual notification on a user interface within the cab of a work vehicle towing the agricultural implement. Thereafter, the operator may make any suitable operating parameter adjustment(s) to the agricultural implement based on the determined characteristic length range.

In some embodiments, the notification may include a recommended adjustment(s) for the operator to make to an operating parameter(s) of the agricultural implement. In such embodiments, the operator may make the recommended operating parameter adjustment(s). Alternatively, the operator may provide an input to the computing system accepting or rejecting the recommended operating parameter adjustment(s). When the recommended operating parameter adjustment(s) is accepted, the computing system may, in some embodiments, automatically initiate such adjustment(s).

Determining a characteristic length range for the residue pieces within the imaged portion of the field and providing an associated notification to the operator improves the operation of the agricultural implement. More specifically, to leave residue pieces on the field surface having a given length after completion of an agricultural operation (e.g., a tillage operation), it is generally necessary to adjust the operating parameter(s) of the agricultural implement based on the lengths of the residue pieces present within the field prior to the operation. Because there can be a variety of lengths of residue pieces present on a portion of the field, some conventional systems use the average length of residue pieces or the range of lengths to control the implement operating parameter(s). However, in many instances, the lengths of the residue pieces may be skewed toward one end of the range. For example, a portion of the field may have many long residue pieces, with a few short pieces. Alternatively, the portion of the field may have many short residue pieces, with a few long pieces. In this respect, the average length and the length range of the residue pieces for a portion of the field may not provide an accurate indication of the typical lengths of the residue pieces present within that portion of the field. As described above, the characteristic length range corresponds to the particular residue piece length range having the greatest number of residue pieces associated therewith. Thus, by providing a notification indicating the particular residue piece length range having the greatest number of residue pieces associated therewith, the operator can tailor the operating parameter(s) of the agricultural implement to the residue length range most prevalent within the field. This, in turn, results in the lengths of residue pieces remaining on the field surface upon completion of the agricultural operation more closely corresponding to the given/wanted length.

Figure 2:
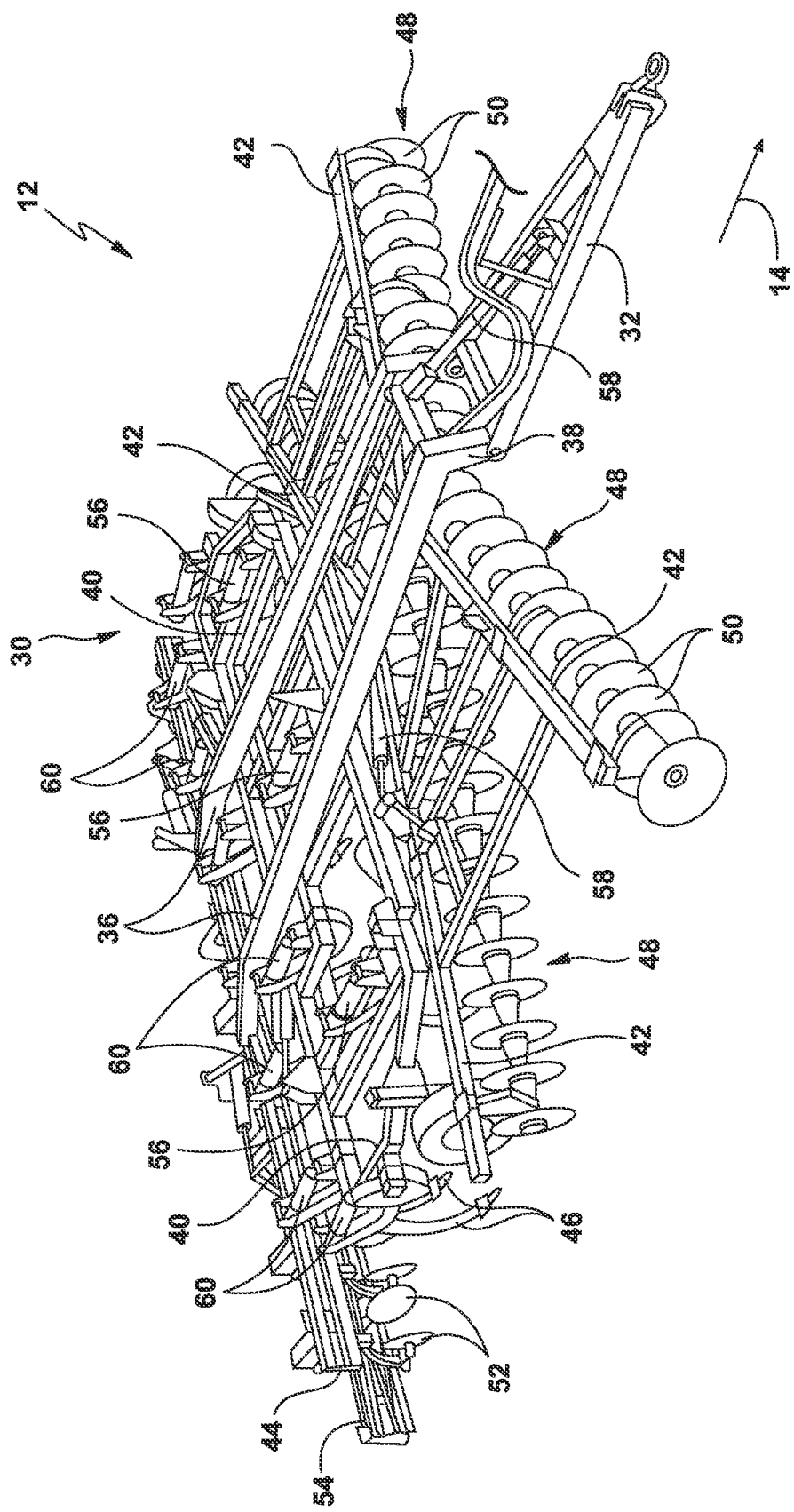
FIG. 2 illustrates a perspective view of the agricultural implement shown in FIG. 1.

Referring now to drawings, FIGS. 1 and 2 illustrate perspective views of one embodiment of a work vehicle 10 and an associated agricultural implement 12 in accordance with aspects of the present subject matter. Specifically, FIG. 1 illustrates a perspective view of the work vehicle 10 towing the agricultural implement 12 across a field in a travel direction (e.g., as indicated by arrow 14). Additionally, FIG. 2 illustrates a perspective view of the agricultural implement 12 shown in FIG. 1.

As shown in the illustrated embodiment, the work vehicle 10 is configured as an agricultural tractor and the agricultural implement 12 is configured as a tillage implement. However, in other embodiments, the work vehicle 10 may be configured as any other suitable agricultural or other type of work vehicle. Similarly, in other embodiments, the agricultural implement 12 may be configured as any other suitable agricultural implement configured to be towed by a work vehicle.

As particularly shown in FIG. 1, the work vehicle 10 includes a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices (e.g., a user interface 102) for permitting an operator to control the operation of one or more components of the work vehicle 10 and/or one or more components of the implement 12.

Additionally, as shown in FIGS. 1 and 2, the implement 12 may generally include a carriage frame assembly 30 configured to be towed by the work vehicle 10 via a pull hitch or tow bar 32 in the travel direction 14 of the vehicle/implement 10/12. In general, the carriage frame assembly 30 may support a plurality of ground-engaging tools, such as a plurality of shanks, disk blades, leveling blades, basket assemblies, tines, spikes, and/or the like. In several embodiments, the various ground-engaging tools may be configured to perform a tillage operation or any other suitable ground-engaging operation across the field along which the implement 12 is being towed.

As particularly shown in FIG. 2, the carriage frame assembly 30 may include aft extending carrier frame members 36 coupled to the tow bar 32. In addition, reinforcing gusset plates 38 may be used to strengthen the connection between the tow bar 32 and the carrier frame members 36. In several embodiments, the carriage frame assembly 30 may generally support a central frame 40, a forward frame 42 positioned forward of the central frame 40 relative to the travel direction 14 of the vehicle/implement 10/12, and an aft frame 44 positioned aft of the central frame 40 relative to the travel direction 14 of the vehicle/implement 10/12. As shown, in one embodiment, the central frame 40 may correspond to a shank frame configured to support a plurality of ground-engaging shanks 46. In such an embodiment, the shanks 46 may be configured to till or otherwise engage the soil as the implement 12 is towed across the field. However, in other embodiments, the central frame 40 may be configured to support any other suitable ground-engaging tools.

Additionally, as shown in FIG. 2, in one embodiment, the forward frame 42 may correspond to a disk frame configured to support various gangs or sets 48 of disks 50. Specifically, the disks 50 are spaced apart from each other along the length of the disk gang 48 and configured to rotate relative to the soil within the field as the agricultural implement 12 travels across the field in the travel direction 14. Furthermore, each disk 50 may include both a concave side (not shown) and a convex side (not shown). In addition, the various gangs 48 of disks 50 may be oriented at an angle relative to the travel direction 14 of the vehicle/implement 10/12 to promote more effective tilling of the soil. However, in other embodiments, the forward frame 42 may be configured to support any other suitable ground-engaging tools.

Moreover, like the central and forward frames 40, 42, the aft frame 44 may also be configured to support a plurality of ground-engaging tools. For instance, in the illustrated embodiment, the aft frame is configured to support a plurality of leveling blades 52 and rolling (or crumbler) basket assemblies 54. However, in other embodiments, any other suitable ground-engaging tools may be coupled to and supported by the aft frame 44, such as a plurality closing disks.

In addition, the implement 12 may also include any number of suitable ground-engaging tool actuators (e.g., hydraulic cylinders) for adjusting the relative positioning of, the penetration depth of, and/or the force being applied to the various ground-engaging tools 46, 50, 52, 54. For instance, the implement 12 may include one or more actuators 56 coupled to the central frame 40 for raising and/or lowering the central frame 40 relative to the ground, thereby allowing the penetration depth of and/or the force being applied to the shanks 46 to be adjusted. Similarly, the implement 12 may include one or more actuators 58 coupled to the forward frame 42 to adjust the penetration depth of and/or the force being applied to the disk blades 50. Moreover, the implement 12 may include one or more actuators 60 coupled to the aft frame 44 to allow the aft frame 44 to be moved relative to the central frame 40, thereby allowing the relevant operating parameters of the ground-engaging tools 52, 54 supported by the aft frame 44 (e.g., the force being applied to and/or the penetration depth of) to be adjusted.

The configuration of the work vehicle 10 described above and shown in FIG. 1 is provided only to place the present subject matter in an exemplary field of use. Thus, the present subject matter may be readily adaptable to any manner of work vehicle configuration.

Additionally, the configuration of the agricultural implement 12 described above and shown in FIGS. 1 and 2 is only provided for exemplary purposes. Thus, the present subject matter may be readily adaptable to any manner of implement configuration. For example, the agricultural implement 12 may be configured as a planting implement, a fertilizing implement, and/or any other suitable type of agricultural implement.

Referring particularly to FIG. 1, the work vehicle 10 and/or the agricultural implement 12 may include one or more imaging devices 104 coupled thereto and/or supported thereon. More specifically, the imaging device(s) 104 is configured to generate image data depicting a portion of the field present within its field of view 106 as the vehicle/implement 10/12 moves across the field in the travel direction 14. As will be described below, the image data generated by the imaging device(s) 104 is analyzed to identify the lengths of the residue pieces depicted therein. Such length data is subsequently used in controlling the operation of the agricultural implement 12.

In general, the imaging device(s) 104 may correspond to any suitable sensing devices configured to generate image data or image-like data depicting the surface profile of the field. Specifically, in several embodiments, the imaging device(s) 104 may correspond to a suitable camera(s) configured to capture images of the soil surface of the field present within the field of view 106, thereby allowing the lengths of the residue pieces present on the surface of the field to be determined by analyzing the content of each image. For instance, in a particular embodiment, each imaging device(s) 104 may correspond to a stereographic camera(s) having two or more lenses with a separate image sensor for each lens to allow the cameras to capture stereographic or three-dimensional images. Alternatively, the imaging device(s) 104 may correspond to any other suitable devices for generating image data or image-like data, such as a monocular camera(s), a LiDAR device(s), a RADAR device(s), and/or the like.

The imaging device(s) 104 may be mounted at any suitable location(s) on the work vehicle 10 and/or the agricultural implement 12 that allows the imaging device(s) 104 to generate image data depicting a portion(s) of the field forward of the ground-engaging tools 46, 50, 52 of the implement 12. For example, in the illustrated embodiment, an imaging device 104 is mounted on the forward end of the work vehicle 10. However, in alternative embodiments, an imaging device(s) 104 may be mounted at any other suitable location(s), such as at the forward end of the carriage frame assembly 30 or the forward frame 42 of the agricultural implement 12.

Additionally, in the illustrated embodiment, a single imaging device 104 is in operative association with the work vehicle 10. However, in alternative embodiments, multiple imaging devices 104 may be in operative association with the work vehicle 10 and/or the agricultural implement 12.

Figure 3:
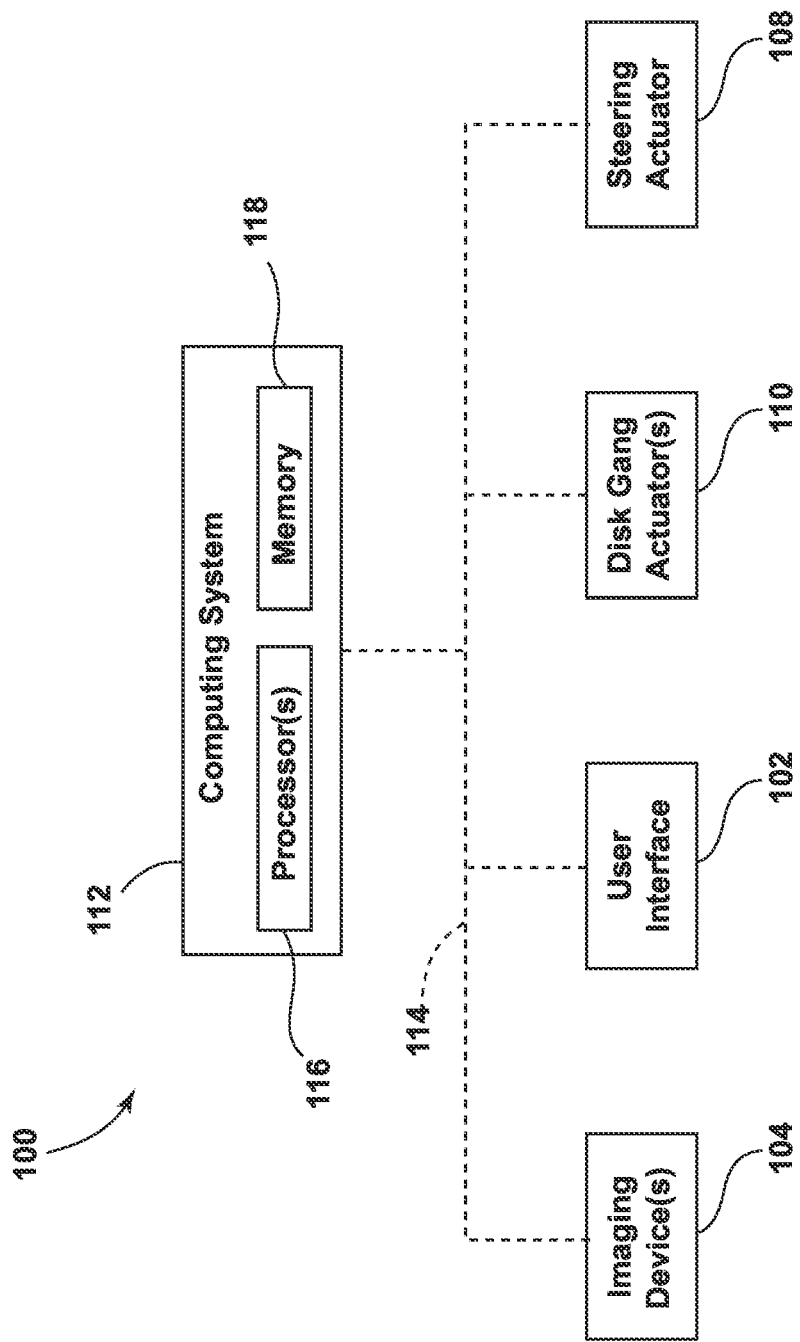
FIG. 3 illustrates a schematic view of one embodiment of a system for controlling the operation of an agricultural implement in accordance with aspects of the present subject matter.

Referring now to FIG. 3, a schematic view of one embodiment of a system 100 for controlling the operation of an agricultural implement is illustrated in accordance with aspects of the present subject matter. In general, the system 100 will be described herein with reference to the work vehicle 10 and the agricultural implement 12 described above with reference to FIGS. 1 and 2. However, it should be appreciated by those of ordinary skill in the art that the disclosed system 100 may generally be utilized with work vehicles having any other suitable vehicle configuration and/or agricultural implements having any other suitable implement configuration.

In several embodiments, the system 100 may include a steering actuator 108 of the work vehicle 10. In general, the steering actuator 108 is configured to adjust the travel direction 14 of the work vehicle 10. For example, the steering actuator 108 may correspond to an electric motor, a linear actuator, a hydraulic cylinder, a pneumatic cylinder, or any other suitable actuator coupled to suitable mechanical assembly, such as a rack and pinion or a worm gear assembly.

Furthermore, the system 100 may include one or more disk gang actuator(s) 110 of the agricultural implement 12. In general, each disk gang actuator 110 is configured to adjust the angle or orientation of one of the disk gangs 48 of the implement 12 relative to the carriage frame 30 of the implement 12. Adjusting the angle(s) of the disk gang(s) 48 relative to the carriage frame 30, in turn, adjusts the lengths of the residue pieces remaining on surface of the field upon completion of the agricultural operation. The disk gang actuator(s) 110 may correspond to any suitable device(s) for adjusting the angle(s) of the disk gang(s) 48, such as a hydraulic cylinder(s), a pneumatic cylinder(s), an electric linear actuator(s), and/or the like. Additionally, the system 100 may include any other suitable components of the work vehicle 10 and/or the agricultural implement 12.

Moreover, the system 100 includes a computing system 112 communicatively coupled to one or more components of the work vehicle 10, the agricultural implement 12, and/or the system 100 to allow the operation of such components to be electronically or automatically controlled by the computing system 112. For instance, the computing system 112 may be communicatively coupled to the imaging device(s) 104 via a communicative link 114. As such, the computing system 112 may be configured to receive image data from the imaging device(s) 104 that is indicative of the residue present within the field across which the vehicle/implement 10/12 is traveling. Furthermore, the computing system 112 may be communicatively coupled to the steering actuator 108 via the communicative link 114. In this respect, the computing system 112 may be configured to control the operation of the steering actuator 108 to adjust the travel direction 14 of the vehicle/implement 10/12. Additionally, the computing system 112 may be communicatively coupled to the disk gang actuator(s) 110 via the communicative link 114. In this respect, the computing system 112 may be configured to control the operation of the disk gang actuator(s) 110 to adjust the angle of the disk gang(s) 48 relative to the carriage frame 30. In addition, the computing system 112 may be communicatively coupled to any other suitable components of the work vehicle 10, the agricultural implement 12, and/or the system 100.

In general, the computing system 112 may comprise one or more processor-based devices, such as a given controller or computing device or any suitable combination of controllers or computing devices. Thus, in several embodiments, the computing system 112 may include one or more processor(s) 116 and associated memory device(s) 118 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 118 of the computing system 112 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 118 may generally be configured to store suitable computer-readable instructions that, when implemented by the processor(s) 116, configure the computing system 112 to perform various computer-implemented functions, such as one or more aspects of the methods and algorithms that will be described herein. In addition, the computing system 112 may also include various other suitable components, such as a communications circuit or module, one or more input/output channels, a data/control bus and/or the like.

The various functions of the computing system 112 may be performed by a single processor-based device or may be distributed across any number of processor-based devices, in which instance such devices may be considered to form part of the computing system 112. For instance, the functions of the computing system 112 may be distributed across multiple application-specific controllers or computing devices, such as a navigation controller, an engine controller, a transmission controller, an implement controller, and/or the like.

In addition, the system 100 may also include a user interface 102. More specifically, the user interface 102 may be configured to provide feedback from the computing system 112 (e.g., feedback associated with the lengths of the residue pieces present on the surface of the field) to the operator. As such, the user interface 102 may include one or more feedback devices (not shown), such as display screens, speakers, warning lights, and/or the like, which are configured to provide feedback from the computing system 112 to the operator. As such, the user interface 102 may, in turn, be communicatively coupled to the computing system 112 via the communicative link 114 to permit the feedback to be transmitted from the computing system 112 to the user interface 102. Furthermore, some embodiments of the user interface 102 may include one or more input devices, such as touchscreens, keypads, touchpads, knobs, buttons, sliders, switches, mice, microphones, and/or the like, which are configured to receive inputs from the operator. In one embodiment, the user interface 102 may be mounted or otherwise positioned within the cab 22 of the work vehicle 10. However, in alternative embodiments, the user interface 102 may mounted at any other suitable location. For example, in some embodiments, the user interface 102 may be a remote computing device(s), such as a Smartphone, a tablet, a laptop, a desktop, and/or the like.

Figure 4:
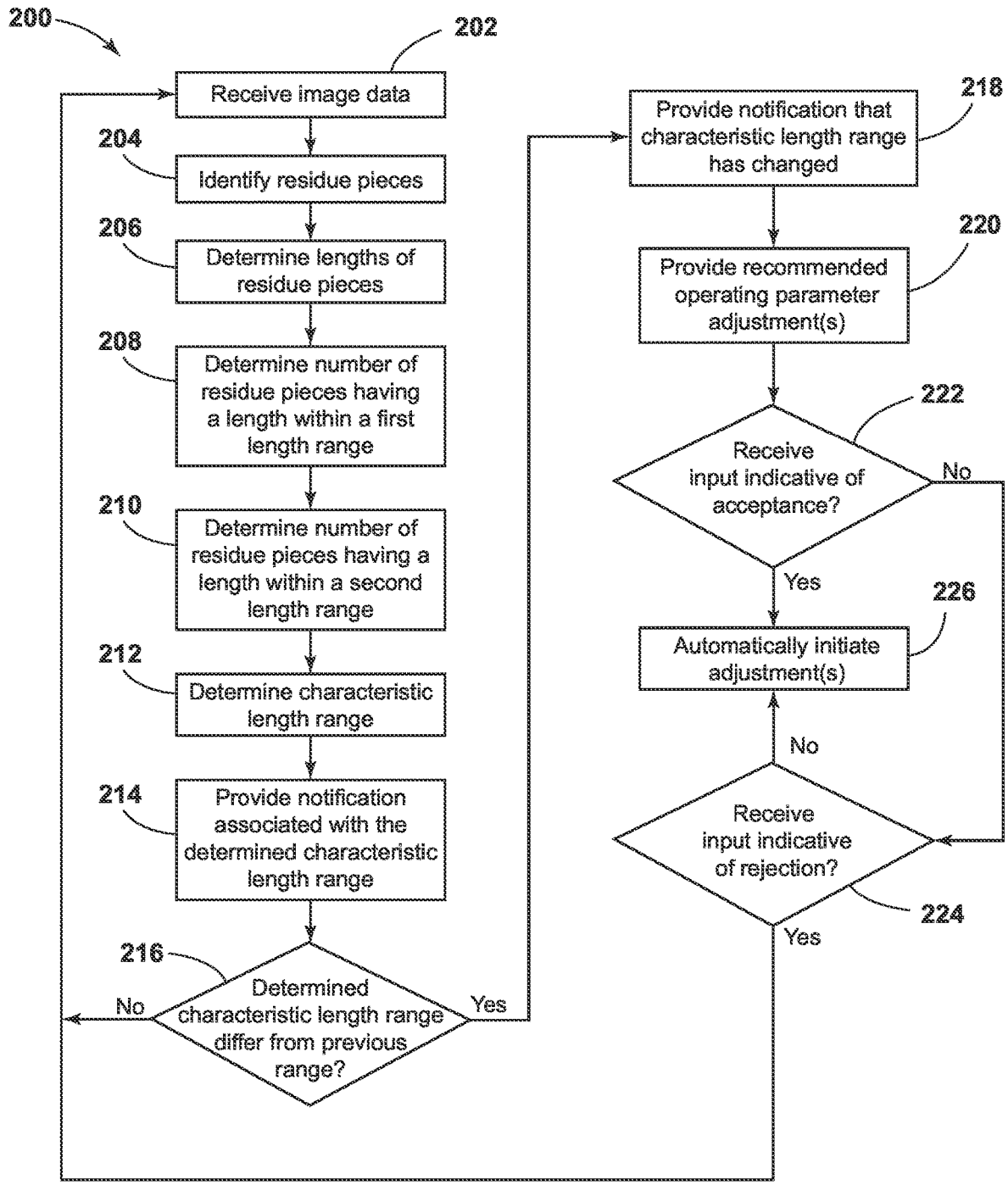
FIG. 4 illustrates a flow diagram providing one embodiment of control logic for controlling an operation of an agricultural implement in accordance with aspects of the present subject matter.

Referring now to FIG. 4, a flow diagram of one embodiment of example control logic 200 that may be executed by the computing system 112 (or any other suitable computing system) for controlling the operation of an agricultural implement is illustrated in accordance with aspects of the present subject matter. Specifically, the control logic 200 shown in FIG. 4 is representative of steps of one embodiment of an algorithm that can be executed to control the operation of an agricultural implement in a manner that results in the lengths of the residue pieces remaining on the field surface upon completion of the agricultural operation more closely corresponding to a selected or given length. Thus, in several embodiments, the control logic 200 may be advantageously utilized in association with a system installed on or forming part of a work vehicle and/or an agricultural implement to allow for real-time control of the agricultural implement without requiring substantial computing resources and/or processing time. However, in other embodiments, the control logic 200 may be used in association with any other suitable system, application, and/or the like for controlling the operation of an agricultural implement.

As shown, at (202), the control logic 200 includes receiving image data depicting a portion of a field across which an agricultural implement is traveling. Specifically, as mentioned above, in several embodiments, the computing system 112 is communicatively coupled to the imaging device(s) 104 via the communicative link 114. In this respect, as the agricultural implement 12 travels across the field to perform an agricultural operation (e.g., a tillage operation) thereon, the computing system 112 may receive image data from the imaging device(s) 104. Such image data, in turn, depicts the residue pieces present on the surface of a portion of the field.

Furthermore, at (204), the control logic 200 includes identifying, with the computing system, a plurality of residue pieces present within the portion of the field based on the received image data. Specifically, in several embodiments, the computing system 112 is configured to analyze the image data received at (202) to identify a plurality of residue pieces present within the portion of the field depicted in the received image data. For example, the computing system 112 may use any suitable image processing algorithms or techniques to identify the residue pieces, such as color-based image processing algorithms, texture-based image processing algorithms, and/or the like.

Additionally, at (206), the control logic 200 includes determining the lengths of the identified plurality of residue pieces. Specifically, in several embodiments, the computing system 112 is configured to analyze each of the plurality of residue pieces identified at (204) to determine its length. As used herein, the length of a residue piece corresponds to its longest dimension.

Moreover, at (208), the control logic 200 includes determining, with the computing system, the number of identified residue pieces having a length within a first length range. Specifically, in several embodiments, the computing system 112 is configured to analyze the lengths of the residue pieces determined at (206) to determine the number of identified residue pieces having a length within a first length range.

In addition, at (210), the control logic 200 includes determining the number of identified residue pieces having a length within a second length range. Specifically, in several embodiments, the computing system 112 is configured to analyze the lengths of the residue pieces determined at (206) to determine the number of identified residue pieces having a length within a second length range. In general, the second length range is different from the first length range. For example, the first length range may correspond to a small length range and the second length range may correspond to a large length range. In one embodiment, the first and second length ranges do not overlap.

The control logic 200 is described herein in the context of two length ranges. However, in alternative embodiments, the lengths determined at (206) may be placed into any suitable number of length ranges, such as three length ranges (e.g., small, medium, and large length ranges) or four or more length ranges.

Furthermore, at (212), the control logic 200 includes determining a characteristic length range for the portion of the field. The characteristic length range, in turn, corresponds to the first or second length range having the greatest number of residue pieces associated therewith. As such, the computing system 112 is configured to determine a characteristic length range for the portion of the field based on the number residue pieces having lengths within the first length range and the number residue pieces having lengths within the second length range. Specifically, the computing system 112 determines which of the first and second length ranges has the most residue pieces with lengths falling therein and assigns that length range as the characteristic length range. For example, when more residue pieces have lengths falling within the first length range than the second length range, the computing system 112 determines that the first length range is the characteristic length range. Conversely, when more residue pieces have lengths falling within the second length range than the first length range, the computing system 112 determines that the second length range is the characteristic length range.

Figure 5:
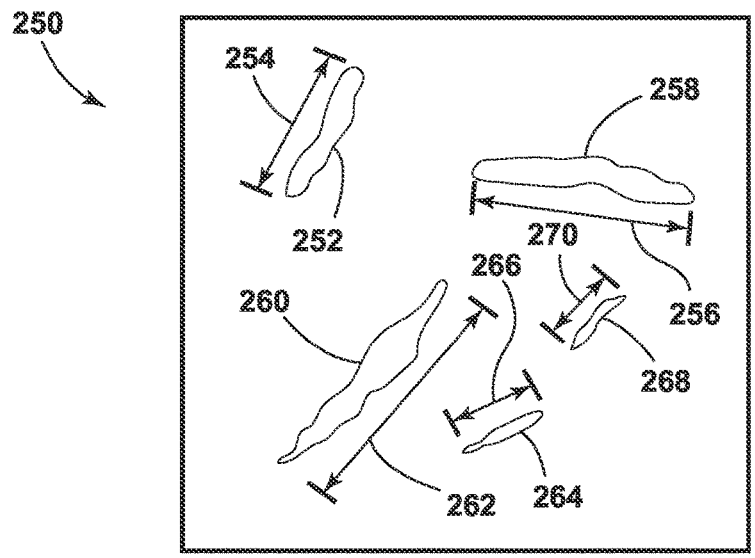
FIG. 5 illustrates an example view of an imaged portion of a field in accordance with aspects of the present subject matter, particularly illustrating a plurality of residues having lengths falling within different length ranges.

FIG. 5 illustrates an example view of an imaged portion of a field 250. As shown, the imaged portion of the field 250 includes a first residue piece 252 having a first length 254, a second residue piece 256 having a second length 258, a third residue piece 260 having a third length 262, a fourth residue piece 264 having a fourth length 266, and a fifth residue piece 268 having a fifth length 270. Assuming that the first, second, and third lengths 254, 258, 262 fall within the second length range (e.g., a large length range) and the fourth and fifth lengths 266, 270 fall within the first length range (e.g., a small length range), the characteristic length range for the imaged portion of the field 250 would be the second length range.

Referring again to FIG. 4, at (214), the control logic 200 includes providing a notification associated with the determined characteristic length range to an operator of the agricultural implement. Specifically, as mentioned above, in several embodiments, the computing system 112 is communicatively coupled to the user interface 102 via the communicative link 114. In this respect, as the agricultural implement 12 travels across the field to perform the agricultural operation thereon, the computing system 112 may feedback signals to the user interface 102 via the communicative link 114. Such feedback signals may, in turn, instruct the user interface 102 to provide a notification associated with the determined characteristic length range to the operator of the vehicle/implement 10/12. Thereafter, the operator may, in certain embodiments, make any suitable adjustment to the operating parameter(s) of the work vehicle 10 and/or the agricultural implement 12 that is necessary or desirable based on the determined characteristic length range.

The notification associated with the determined characteristic length range provided to the operator at (214) may correspond to any suitable type of notification. For example, in some embodiments, the computing system 112 may be configured to initiate a visual display associated with the determined characteristic length range on the user interface 102. However, in alternative embodiments, the notification may be an audible notification.

Additionally, at (216), the control logic 200 includes comparing the determined characteristic length range to a previously determined characteristic length range. Specifically, in several embodiments, the computing system 112 is configured to compare the characteristic length range determined at (212) for the current portion of the field to the determined characteristic length range for the previous portion of the field. When the current characteristic length range differs from the previously determined characteristic length range, the control logic 200 proceeds to (218). Alternatively, when the current characteristic length range is the same as the previously determined characteristic length range, the control logic 200 returns to (202).

Moreover, at (218), the control logic 200 includes providing a notification to the operator that the characteristic length range has changed. Specifically, in several embodiments, when it is determined at (216) that the current characteristic length range differs from the previously determined characteristic length range, the computing system 112 may provide a notification to the operator of the vehicle/implement 10/12 via the user interface 102 that the characteristic length range has changed.

In addition, at (220), the control logic 200 includes providing a recommended operating parameter adjustment to the operator. Specifically, in several embodiments, when it is determined at (216) that the current characteristic length range differs from the previously determined characteristic length range, the computing system 112 may provide a notification to the operator of the vehicle/implement 10/12 via the user interface 102 with one or more recommended operating parameter adjustments for the agricultural implement 12. For example, at (220), the computing system 112 may provide a recommended disk angle for the agricultural implement 12 and/or a recommended travel direction for the vehicle/implement 10/12. However, in alternative embodiments, any other suitable operating parameter adjustments may be recommended at (220).

In some embodiments, upon display of the recommended operating parameter adjustment(s) at (220), the operator may, in certain instances, manually make the recommended operating parameter adjustment(s). Alternatively, the operator may decide to disregard the recommended operating parameter adjustment(s).

Conversely, in several embodiments, upon display of the recommended operating parameter adjustment(s) at (220), the operator may provide either a first input to the user interface 102 indicative of acceptance of the recommended operating parameter adjustment(s) or a second input to the user interface 102 indicative of rejection of the recommended operating parameter adjustment(s). Thereafter, the first or second operator input may be transmitted from the user interface 102 to the computing system 112 via the communicative link 114. Thus, the computing system 112 may be configured to receive a first input indicative of acceptance of the recommended operating parameter adjustment(s) or a second input indicative of rejection of the recommended operating parameter adjustment(s).

Furthermore, at (222), the control logic 200 includes determining whether a first input from the operator indicative of acceptance of the recommended operating parameter adjustment has been received. Specifically, in several embodiments, after providing the recommended operating parameter adjustment(s) at (220), the computing system 112 is configured to determine whether the first input from the operator indicative of acceptance of the recommended operating parameter adjustment(s) has been received. When the first input is not received, the control logic 200 proceeds to (224). Alternatively, when the first input is received, the control logic proceeds to (226).

Additionally, at (224), the control logic 200 includes determining whether a second input from the operator indicative of rejection of the recommended operating parameter adjustment has been received. Specifically, in several embodiments, after providing the recommended operating parameter adjustment(s) at (220), the computing system 112 is configured to determine whether the second input from the operator indicative of rejection of the recommended operating parameter adjustment(s) has been received. When the second input is received, the control logic 200 returns to (202). Alternatively, when the second input is not received, the control logic proceeds to (226).

Moreover, at (226), the control 200 includes automatically initiating the recommended operating parameter adjustment. Specifically, in several embodiments, when the first input is received (i.e., the operator accepts the recommended operating parameter adjustment(s)) or no input is received, the computing system 112 may automatically initiate the operating parameter adjustment(s) recommended at (220). Upon completion of (226), the control logic 200 returns to (202).

As mentioned above, the recommended operating parameter adjustment(s) may include a recommended disk gang angle adjustment. In some embodiments, the angle of the disk gangs 48 of the agricultural implement 12 may be adjustable relative to the carriage frame 30 of the implement 12 via the disk gang actuator(s) 110. In such embodiments, the computing system 112 may transmit control signals to the disk gang actuator(s) 110 via the communicative link 114. Such control signals, in turn, instruct the disk gang actuator(s) 110 to automatically adjust the disk gang angle(s) as recommended at (220).

Figure 6:
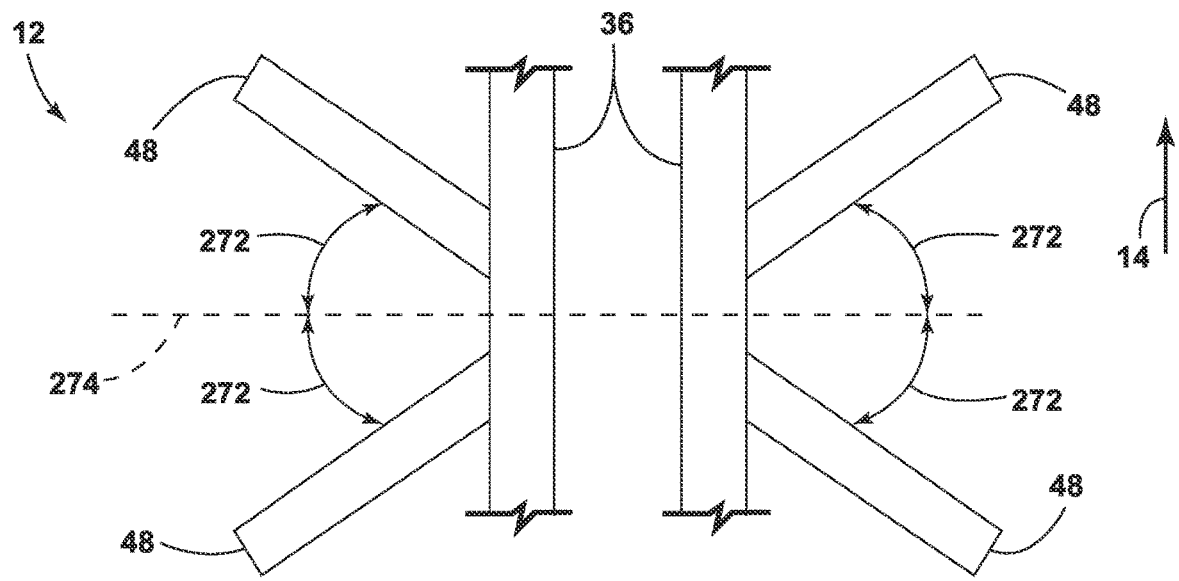
FIG. 6 illustrates a diagrammatic top view of an agricultural implement in accordance with aspects of the present subject matter, particularly illustrating a disk gang angle of the agricultural implement.

FIG. 6 illustrates the disk gang angle of the agricultural implement 12 as used herein. As shown, disk gang angles 272 are defined between the disk gangs 48 and a lateral centerline 274 of the agricultural implement 12, with the lateral centerline 274 extending perpendicular to the travel direction 14.

In addition, as mentioned above, the recommended operating parameter adjustment(s) may include a recommended travel direction for the agricultural implement 12. In some embodiments, the angle of the disk gangs 48 of the agricultural implement 12 may be fixed relative to the carriage frame 30 of the implement 12. In such embodiments, the computing system 112 may transmit control signals to the steering actuator 108 of the work vehicle 10 via the communicative link 114. Such control signals, in turn, instruct the steering actuator 108 to automatically adjust the travel direction 14 as recommended at (220). Alternatively, the computing system 112 may adjust the position of a guidance line being used to guide the vehicle/implement 10/12 across the field. Such adjustment to the travel direction 14 cause the disk gang(s) 48 to act as if the disk gang angle(s) had been adjusted relative to the carriage frame 30. However, in alternative embodiments, the computing system 112 may be configured to automatically initiate any other suitable recommended operating parameter adjustments. In some embodiments, (216)-(226) may be omitted.

Figure 7:
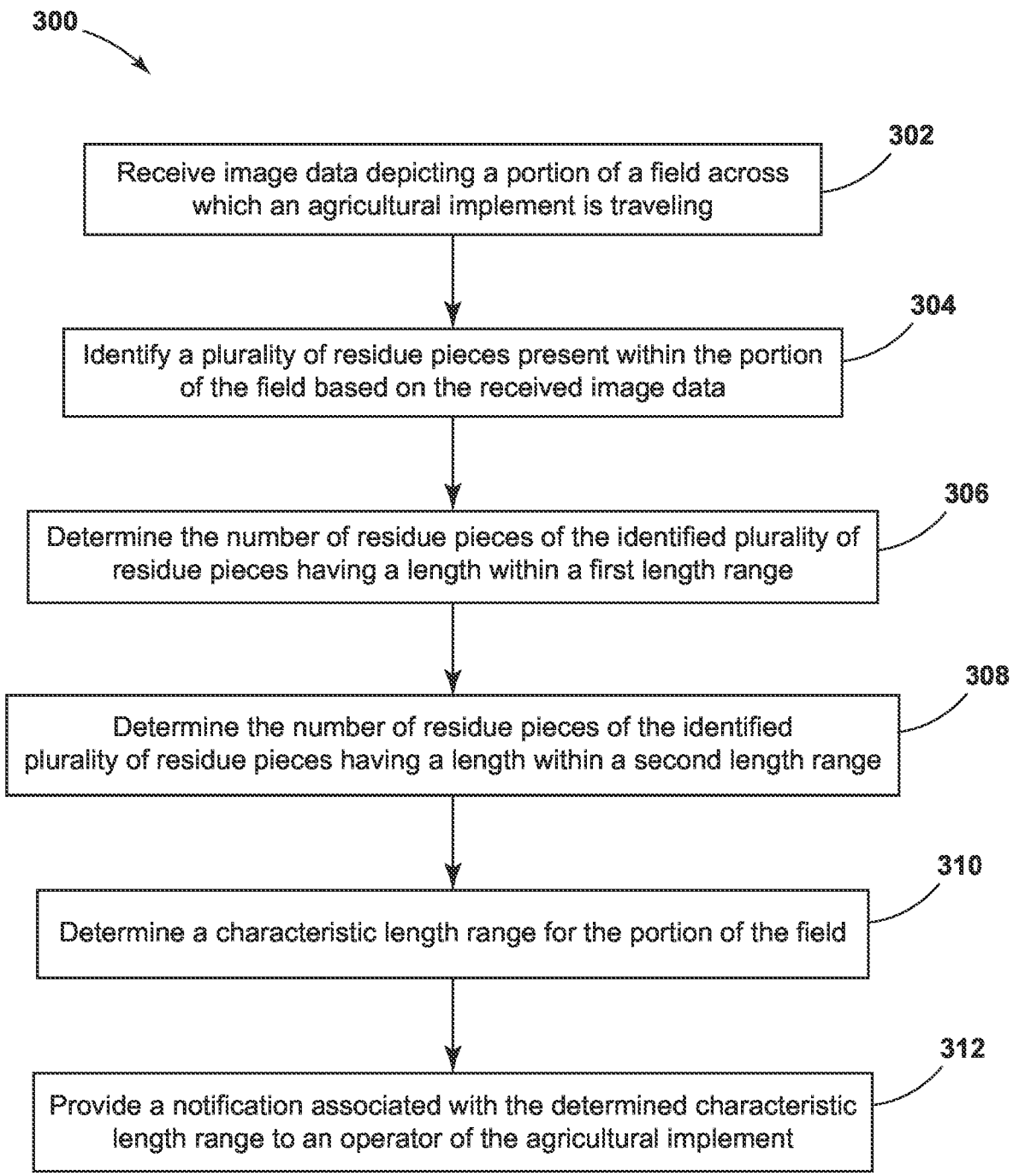
FIG. 7 illustrates a flow diagram of one embodiment of a method for controlling the operation of an agricultural implement in accordance with aspects of the present subject matter.

Referring now to FIG. 7, a flow diagram of one embodiment of a method 300 for controlling the operation of an agricultural implement is illustrated in accordance with aspects of the present subject matter. In general, the method 300 will be described herein with reference to the work vehicle 10, the agricultural implement 12, and the system 100 described above with reference to FIGS. 1-6. However, it should be appreciated by those of ordinary skill in the art that the disclosed method 300 may generally be implemented with any work vehicle having any suitable vehicle configuration, any agricultural implement having any suitable implement configuration, and/or within any system having any suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (302), the method 300 includes receiving, with a computing system, image data depicting a portion of a field across which an agricultural implement is traveling. For instance, as described above, the computing system 112 may receive image data from the imaging device(s) 104 via the communicative link 114. Such image data, in turn, depicts a portion of a field across which the vehicle/implement 10/12 is traveling.

Furthermore, at (304), the method 300 includes identifying, with the computing system, a plurality of residue pieces present within the portion of the field based on the received image data. For instance, as described above, the computing system 112 may identify a plurality of residue pieces present within the portion of the field based on the received image data.

Additionally, at (306), the method 300 includes determining, with the computing system, the number of residue pieces of the identified plurality of residue pieces having a length within a first length range. For instance, as described above, the computing system 112 may determine the number of residue pieces of the identified plurality of residue pieces having a length within a first length range.

Moreover, at (308), the method 300 includes determining, with the computing system, the number of residue pieces of the identified plurality of residue pieces having a length within a second length range. For instance, as described above, the computing system 112 may determine the number of residue pieces of the identified plurality of residue pieces having a length within a different, second length range.

In addition, at (310), the method 300 includes determining, with the computing system, a characteristic length range for the portion of the field. For instance, as described above, the computing system 112 may determine a characteristic length range for the portion of the field. The characteristic length range, in turn, corresponds to one of the first length range or the second length range having the greatest number of residue pieces associated therewith.

Furthermore, at (312), the method 300 includes providing, with the computing system, a notification associated with the determined characteristic length range to an operator of the agricultural implement. For instance, as described above, the computing system 112 may provide a notification via the user interface 102 associated with the determined characteristic length range to the operator of the vehicle/implement 10/12.

It is to be understood that the steps of the control logic 200 and the method 300 are performed by the computing system 112 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 112 described herein, such as the control logic 200 and the method 300, is implemented in software code or instructions which are tangibly stored on a tangible computer readable medium. The computing system 112 loads the software code or instructions via a direct interface with the computer readable medium or via a wired and/or wireless network. Upon loading and executing such software code or instructions by the computing system 112, the computing system 112 may perform any of the functionality of the computing system 112 described herein, including any steps of the control logic 200 and the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An agricultural implement, comprising:
a frame;
a ground-engaging tool supported on the frame, the ground-engaging tool configured to perform an operation on a field as the agricultural implement travels across the field;
an imaging device configured to generate image data depicting a portion of the field; and
a computing system communicatively coupled to the imaging device, the computing system configured to:
identify a plurality of residue pieces present within the portion of the field based on the image data generated by the imaging device;

determine a number of residue pieces of the identified plurality of residue pieces having a length within a first length range;

determine a number of residue pieces of the identified plurality of residue pieces having a length within a second length range, the second length range being different from the first length range;

determine one of the first length range or the second length range having the greatest number of residue pieces associated therewith such that a characteristic length range for the portion of the field corresponds to the one of the first length range or the second length range having the greatest number of residue pieces associated therewith;

compare the determined characteristic length range to a previously determined characteristic length range;

when the determined characteristic length range differs from the previously determined characteristic length range, provide a notification to an operator of the agricultural implement that the characteristic length range has changed, the notification including a recommended operating parameter adjustment;

receive a first input from the operator indicative of acceptance of the recommended operating parameter adjustment or a second input from the operator indicative of rejection of the recommended operating parameter adjustment; and automatically initiate the recommended operating parameter adjustment upon receipt of the first input.

2. The agricultural implement of claim 1, wherein, when providing the notification, the computing system is configured to initiate a visual display associated with the determined characteristic length range on a user interface.

3. The agricultural implement of claim 2, wherein the user interface is positioned within a cab of a work vehicle configured to tow the agricultural implement.

4. The agricultural implement of claim 2, wherein the user interface comprises a remote computing device.

5. A system for controlling an operation of an agricultural implement, the system comprising:
an imaging device configured to generate image data depicting a portion of a field across which the agricultural implement is traveling; and
a computing system communicatively coupled to the imaging device, the computing system configured to:
identify a plurality of residue pieces present within the portion of the field based on the image data generated by the imaging device;
determine a number of residue pieces of the identified plurality of residue pieces having a length within a first length range;
determine a number of residue pieces of the identified plurality of residue pieces having a length within a second length range, the second length range being different from the first length range;
determine one of the first length range or the second length range having the greatest number of residue pieces associated therewith such that a characteristic length range for the portion of the field corresponds to the one of the first length range or the second length range having the greatest number of residue pieces associated therewith;
compare the determined characteristic length range to a previously determined characteristic length range;
when the determined characteristic length range differs from the previously determined characteristic length range, provide a notification to an operator of the agricultural implement that the characteristic length range has changed, the notification including a recommended operating parameter adjustment;
receive a first input from the operator indicative of acceptance of the recommended operating parameter adjustment or a second input from the operator indicative of rejection of the recommended operating parameter adjustment; and
automatically initiate the recommended operating parameter adjustment upon receipt of the first input.

6. The system of claim 5, wherein, when providing the notification to the operator that the characteristic length range has changed, the computing system is further configured to provide a recommended operating parameter adjustment to the operator.

7. The system of claim 6, wherein the recommended operating parameter adjustment comprises at least one of a recommended disk gang angle for the agricultural implement or a recommended direction of travel for the agricultural implement.

8. The system of claim 5, wherein, when providing the notification, the computing system is configured to initiate a visual display associated with the determined characteristic length range on a user interface.

9. The system of claim 8, wherein the user interface is positioned within a cab of a work vehicle configured to tow the agricultural implement.

10. The system of claim 8, wherein the user interface comprises a remote computing device.

11. A method for controlling an operation of an agricultural implement, the method comprising:
receiving, with a computing system, image data depicting a portion of a field across which the agricultural implement is traveling;
identifying, with the computing system, a plurality of residue pieces present within the portion of the field based on the received image data;
determining, with the computing system, a number of residue pieces of the identified plurality of residue pieces having a length within a first length range;
determining, with the computing system, a number of residue pieces of the identified plurality of residue pieces having a length within a second length range, the second length range being different from the first length range;
determining, with the computing system, one of the first length range or the second length range having the greatest number of residue pieces associated therewith such that a characteristic length range for the portion of the field corresponds to the one of the first length range or the second length range having the greatest number of residue pieces associated therewith;
comparing, with the computing system, the determined characteristic length range to a previously determined characteristic length range;
when the determined characteristic length range differs from the previously determined characteristic length range, providing, with the computing system, a notification to an operator of the agricultural implement that the characteristic length range has changed, the notification including a recommended operating parameter adjustment;
receiving, with the computing system, a first input from the operator indicative of acceptance of the recommended operating parameter adjustment or a second input from the operator indicative of rejection of the recommended operating parameter adjustment; and automatically initiating, with the computing system, the recommended operating parameter adjustment upon receipt of the first input.

12. The method of claim 11, wherein the recommended operating parameter adjustment comprises at least one of a recommended disk gang angle for the agricultural implement or a recommended direction of travel for the agricultural implement.

* * * * *